(12) United States Patent
Genschel et al.

(10) Patent No.: US 9,400,990 B2
(45) Date of Patent: *Jul. 26, 2016

(54) SYSTEM FOR MANAGING ELECTRIC ENERGY GRID-VEHICLE EXCHANGE DEVICES

(71) Applicants: ParkPod GmbH, Karlsruhe (DE); ParkPod LLC, San Francisco, CA (US)

(72) Inventors: Rainer Genschel, San Francisco, CA (US); Ralf Schneiderat, Gernsbach (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/166,751

(22) Filed: Jan. 28, 2014

(65) Prior Publication Data

US 2014/0214516 A1    Jul. 31, 2014

Related U.S. Application Data

(63) Continuation of application No. 12/799,296, filed on Apr. 20, 2010, now Pat. No. 8,676,636.

(60) Provisional application No. 61/214,433, filed on Apr. 22, 2009.

(51) Int. Cl.
   *G07B 15/00* (2011.01)
   *G07B 15/02* (2011.01)
   (Continued)

(52) U.S. Cl.
   CPC .......... *G06Q 30/0284* (2013.01); *B60L 11/184* (2013.01); *B60L 11/1816* (2013.01); *B60L 11/1822* (2013.01); *B60L 11/1842* (2013.01); *B60L 11/1844* (2013.01); *B60L 11/1846* (2013.01); *B60L 11/1848* (2013.01); *G06Q 30/00* (2013.01); *G06Q 30/0226* (2013.01); *G06Q 50/06* (2013.01); *B60L 2240/72* (2013.01); *Y02E 60/721* (2013.01); *Y02T 10/7005* (2013.01); *Y02T 10/7072* (2013.01); *Y02T 10/7291* (2013.01); *Y02T 90/121* (2013.01);
   (Continued)

(58) Field of Classification Search
   CPC ..... Y02T 90/128; Y02T 90/14; Y02T 90/163; B60L 11/184; B60L 11/1848; B60L 11/1846
   USPC ........................ 705/13, 14.15, 14.27; 235/381
   See application file for complete search history.

(56) References Cited

U.S. PATENT DOCUMENTS 4,184,580 A * 1/1980 Ellis, Jr. ......................... 194/239
4,532,418 A * 7/1985 Meese et al. ................... 235/381
(Continued)

*Primary Examiner* — Brian Epstein
(74) *Attorney, Agent, or Firm* — Van Pelt, Yi & James LLP

(57) ABSTRACT

A system for managing electric energy exchange devices is disclosed. The system comprises a processor and a memory. The processor is configured to receive a set of predefined parameters for electric energy exchange for a vehicle using an electric energy exchange device for a time increment. The set of predefined parameters comprises price levels associated with levels of customers. The processor is further configured to receive a set of transaction specific parameters. The processor is configured to determine a price for electric energy exchange based at least in part on the set of predefined parameters and the set of transaction specific parameters. The processor is configured to determine whether a level of a customer meets predefined parameters for free electric energy exchange. The processor is configured to, in the event the level of the customer meets the predefined parameters for free electric energy exchange, provide for free electric exchange.

24 Claims, 10 Drawing Sheets

(51) Int. Cl.
 *G06Q 30/02* (2012.01)
 *G06Q 30/00* (2012.01)
 *G06Q 50/06* (2012.01)
 *B60L 11/18* (2006.01)

(52) U.S. Cl.
 CPC .............. *Y02T 90/124* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01); *Y04S 50/14* (2013.01)

(56) References Cited

U.S. PATENT DOCUMENTS

| | | | | |
|---|---|---|---|---|
| 5,563,491 | A * | 10/1996 | Tseng | 320/109 |
| 6,081,205 | A * | 6/2000 | Williams | 340/932.2 |
| 6,089,284 | A * | 7/2000 | Kaehler et al. | 141/94 |
| 6,321,984 | B1 * | 11/2001 | McCall et al. | 235/381 |
| 7,090,122 | B1 * | 8/2006 | Warren et al. | 235/379 |
| 7,792,613 | B2 * | 9/2010 | Kressner et al. | 700/296 |
| 2005/0192832 | A1 * | 9/2005 | Call et al. | 705/1 |
| 2006/0053056 | A1 * | 3/2006 | Alspach-Goss et al. | 705/14 |
| 2006/0155603 | A1 * | 7/2006 | Abendroth et al. | 705/14 |
| 2007/0282495 | A1 * | 12/2007 | Kempton et al. | 701/22 |
| 2008/0033880 | A1 * | 2/2008 | Fiebiger et al. | 705/44 |
| 2008/0281663 | A1 * | 11/2008 | Hakim et al. | 705/8 |
| 2009/0144150 | A1 * | 6/2009 | Sakakibara et al. | 705/14 |
| 2009/0177595 | A1 * | 7/2009 | Dunlap et al. | 705/412 |
| 2009/0313098 | A1 * | 12/2009 | Hafner et al. | 705/14.1 |
| 2009/0313103 | A1 * | 12/2009 | Ambrosio et al. | 705/14.25 |
| 2010/0017044 | A1 * | 1/2010 | Kressner et al. | 700/291 |
| 2010/0039062 | A1 * | 2/2010 | Gu et al. | 320/101 |
| 2010/0156349 | A1 * | 6/2010 | Littrell | B60L 11/1838 320/109 |
| 2010/0161393 | A1 * | 6/2010 | Littrell | 705/13 |
| 2010/0191585 | A1 * | 7/2010 | Smith | 705/13 |
| 2010/0274656 | A1 * | 10/2010 | Genschel et al. | 705/14.27 |

* cited by examiner

SYSTEM FOR MANAGING ELECTRIC ENERGY GRID-VEHICLE EXCHANGE DEVICES

CROSS REFERENCE TO OTHER APPLICATIONS

This application is a continuation of U.S. patent application Ser. No. 12/799,296, now U.S. Pat. No. 8,676,636, entitled SYSTEM FOR MANAGING ELECTRIC ENERGY GRID-VEHICLE EXCHANGE DEVICES filed Apr. 20, 2010 which is incorporated herein by reference for all purposes, which claims priority to U.S. Provisional Patent Application No. 61/214,433, entitled SYSTEM FOR MANAGING CAR CHARGING DEVICES filed Apr. 22, 2009 which is incorporated herein by reference for all purposes.

BACKGROUND OF THE INVENTION

Because electric vehicles (vehicles fully or partially propelled by an electric motor and/or relying for their propulsion fully or partially on energy stored in batteries) have limited range due to the finite capacity of such batteries, a charging infrastructure for electric vehicles will be required or desired in order to enable or facilitate the practical every day use of electric vehicles. Infrastructure, however, is typically costly to install and represents only an expense to the installer. Furthermore, such infrastructure typically does not have many benefits for an owner (lessee) of parking lots, collectively referred to as parking lot owner (PLO), even though the owner is providing the resource of a parking lot enabling parking a vehicle for a period ranging from several minutes to several hours, which is required to recharge its batteries from an electricity grid for the case where a vehicle battery is not removed from the vehicle.

BRIEF DESCRIPTION OF THE DRAWINGS

Various embodiments of the invention are disclosed in the following detailed description and the accompanying drawings.

DETAILED DESCRIPTION

Figure 1A:
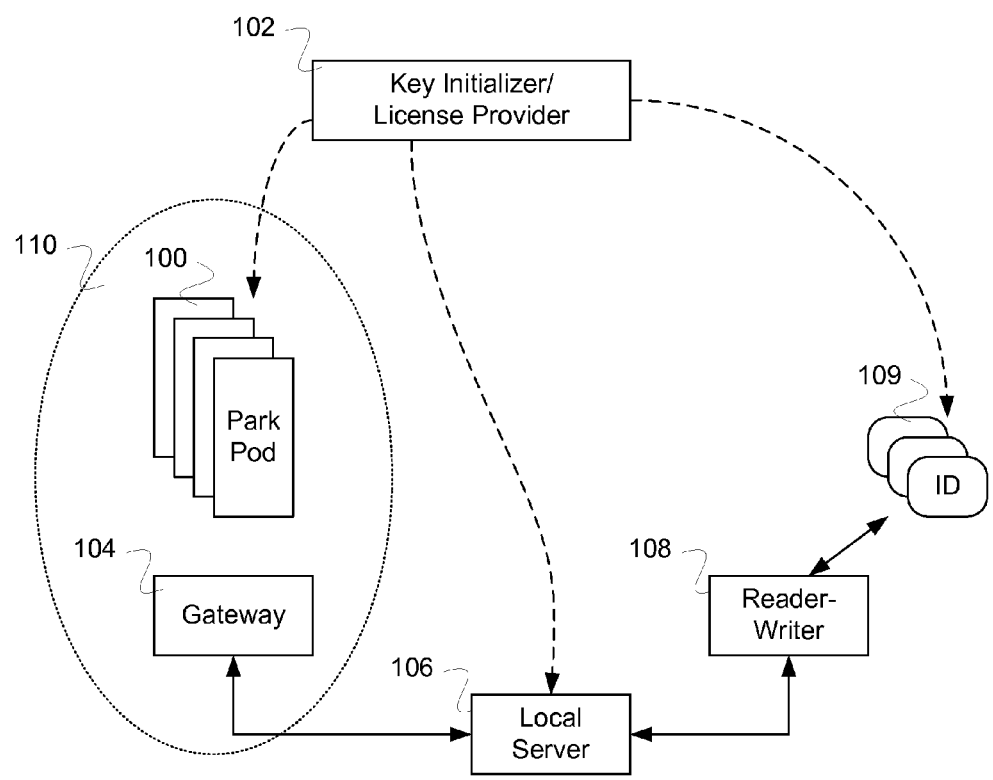
FIGS. 1a, 1b, and 1c are block diagrams illustrating embodiments of a system for managing car electric energy exchange devices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for managing electric energy exchange devices is disclosed. The system comprises a processor and a memory. The processor is configured to receive a set of predefined for electric energy exchange for a vehicle using an electric energy exchange device for a time increment. The processor is further configured to receive a set of transaction specific parameters. The processor is configured to determine a price for electric energy exchange based at least in part on the set of predefined parameters and the set of transaction specific parameters. The memory is coupled to the processor and configured to provide the processor with instructions.

In some embodiments, a system for managing electric energy exchange devices is disclosed. The system comprises a processor and a memory. The processor is configured to receive one or more pricing levels for electric energy exchange for a vehicle using an electric energy exchange device for a time increment. The pricing levels are parameters and depend on the pricing strategy of the provider of the electric energy exchange device and/or the provider of parking space used for electric energy exchange, and or the provider of the energy delivered and/or another party involved in enabling the energy exchange. The processor is further configured to receive a total time for electric energy exchange and/or a total energy amount delivered through electric energy exchange or an approximation thereof and determine a price for electric energy exchange based at least in part on the one or more pricing levels and the total time for electric energy exchange. The memory is coupled to the processor and configured to provide the processor with instructions.

A system for managing car electric energy exchange devices is disclosed. The system includes components to enhance the business value for parking lot owners (PLO's) by enabling adaptation to a PLO's business contexts. The needs of electric vehicle drivers, electric utilities, automotive manufacturers, municipalities, business owners, and other electric vehicle (EV) ecosystem participants are simultaneously addressed by enabling appropriate charging, discharging, billing, and/or rewarding using the system.

An electric energy exchange station is enabled to charge or discharge an electric vehicle for a period of time or with a pre-defined, limited or unlimited amount of charge, energy, and/or power using a key card/smart card or direct vehicle-to-server or vehicle-to-cloud communication, or a key card/smart card embedded in a mobile consumer device like e.g., a cell phone or smart phone. In some embodiments a central or local server manages loading of the cards and/or appropriate databases with appropriate privileges and bills appropriate entities for the loaded privileges. In some embodiments, a business owner tailors the electric energy exchange privileges of a customer or partner's customer by setting parameters for the electric energy exchange of the customer's electric vehicle in the business owner's parking lot. In various embodiments, the coding of keys (e.g., storing information on the keys) is performed by a service provider (e.g., the electric energy exchange system provider), a parking lot owner, an alliance organization, a brand owner, or any other appropriate entity associated with the electric energy exchange system.

In some embodiments, features of the system include: a) a parking lot owner is able to control many aspects of electric energy exchange an electric vehicle with electric energy exchange stations installed in the parking lot; b) a parking lot owner is able to integrate recharging of an EV's battery into tactical marketing for and a customer's experience of the business; c) the customer is not required to subscribe to a charging business; d) system operation and maintenance are simple and less error prone; e) system is based on a modular upgradeable architecture; f) the simple electric energy exchange station hardware has the potential of being initially priced lower than similar competitive electric energy exchange stations; and g) a server system administers authentication logic that allows business or parking lot owner sub-group or cross group privilege management (e.g., customers with fewer or greater privileges—'gold' or 'platinum' levels; and/or cross business use—coffee shop and gym partnership allowing both to use each other's parking lots, etc.).

In various embodiments, aspects controllable by a business owner or any of their business partners in the electric energy exchange for an electric vehicle in a parking lot owner's parking lot include: pricing (e.g., profitable reselling of power, giveaway of power in exchange for enticing visiting of and spending in the business and/or store, promotion-bundled, loyalty-based, or any other appropriate pricing scheme); connectivity tracking (e.g., real time or almost real time monitoring of who (end-user) and what (vehicle) is connected to an electric energy exchange station and where electric energy exchange station unique ID); amount tracking (e.g., fixed or variable amount of power, say x kilowatt-hours, fixed or variable time, say 30 minutes, limits or no limits but measured, say using time or power for the purpose of billing, etc.); bandwidth prioritization (e.g., in the event of a limit imposed by the supply at the parking lot, the electric energy exchange priority of a customer can be prioritized by how much charge the vehicle has currently, the throughput capability of the meter and/or car, a price paid by the customer, a customer status, etc.); access privileges (e.g., a preferred brand user—a gold Coffee Shop key holder, a standard brand user (e.g., a Supermarket key holder), a preferred guest (e.g., an alliance member), a standard guest (e.g., random drive-in), etc.); device networking (e.g., no networking; electric energy exchange device to electric energy exchange device for electric energy exchange prioritization, upgrading, or error code collection; parking lot to point of sale connectivity, parking lot network, group of parking lot networks, network to a central server, etc.; or any other appropriate feature or aspect.

In some embodiments, the electric energy exchange station includes support for charging an electric vehicle using standard alternating current (AC) supplies at 110-240 volts with 12-80 amps (e.g., Level 1 and Level 2 according to existing and/or emerging standards of the society of automotive engineers—e.g. SAE J1772, or any other appropriate electric vehicle standard). In some embodiments, charging an electric vehicle uses 480-600 volts AC or DC with 60-150 kilowatts (e.g., Level 3 National Electric Code). In some embodiments, the electric energy exchange station enables energy transfer from the vehicle to the electric grid (V2G) or vehicle to the home (V2H) or any other facility as well so that vehicles can act as storage for electric power. In some embodiments, the electric energy exchange stations and the vehicles attached to them are identifiable to power networks for communication and billing purposes as well as load balancing applications.

In various embodiments, a parking lot owner comprises one or more of the following: a retail chain (e.g., a dedicated associated parking lot or owned parking, a food retailer such as a market or restaurant, clothing retailer, etc.); a mall, a hotel/motel, a rest area, a managed parking lot or garage owner, an event venue parking lot owner (e.g., a park, a museum, a convention center, a concert hall, stadium, sports arena, church, a theme park, etc.), government (e.g., federal, state, or municipal owner of facilities, airports, buildings, office buildings, metered street parking, residential street parking, etc.), employers, private residence, or any other appropriate parking lot owner.

In some embodiments, the system enables reselling of power at a substantial margin. In some embodiments, the system provides incentive to users to remain in the business for a time that targets optimizing spending of a customer in the business by providing charging of the vehicle for the targeted time for no cost or for low-cost.

In some embodiments, the system enables rewarding loyal or frequent customers by providing the loyal or frequent customers charging credits. In some embodiments, the system enables rewarding partner companies by enabling privileges (e.g., extra time for free, reduced rates, etc.) for customers of a partner company at a given parking lot.

In some embodiments, the system enables a parking lot owner to better manage parking lot usage by allowing monitoring of parking time (e.g., time attached to a electric energy exchange station, etc.) and potentially identification of parking lot abusers (e.g., vehicle attached to electric energy exchange station much longer than customer actually in business and/or long after completing a transaction at a point of sale).

In some embodiments, electric energy exchange station has low component count enabling low-cost installation of units. In some embodiments, an electric energy exchange station is referred to as a ParkPod.

Figure 1B:
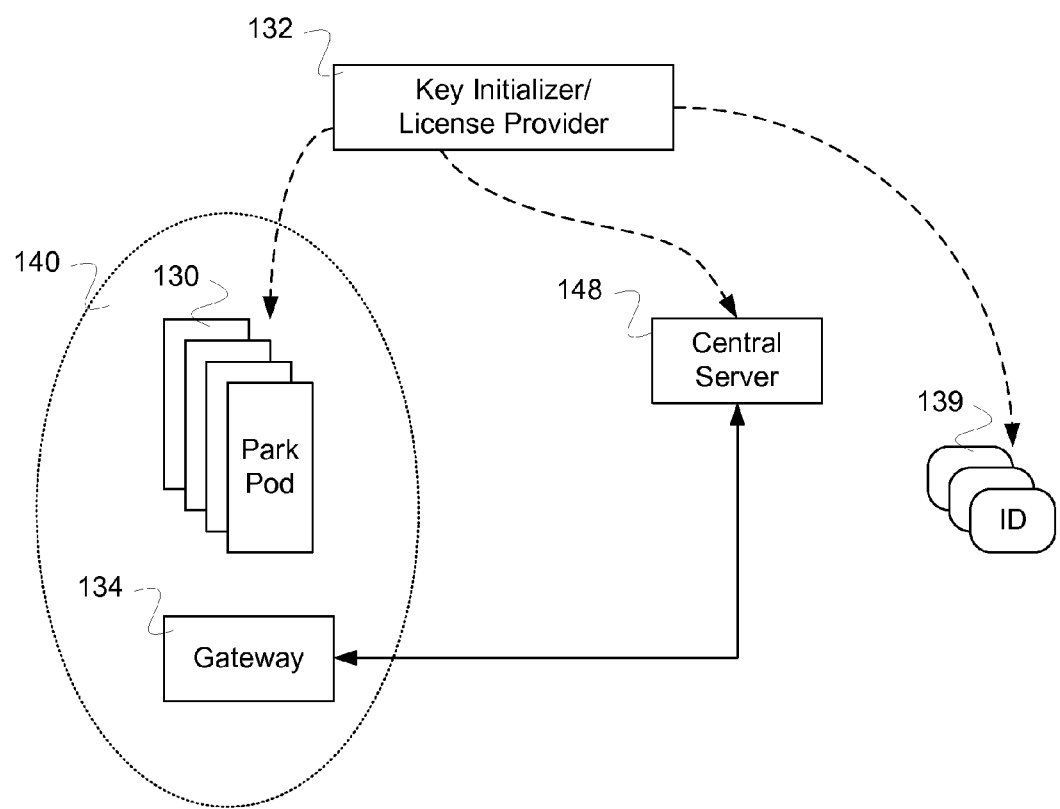
Figure 1C:
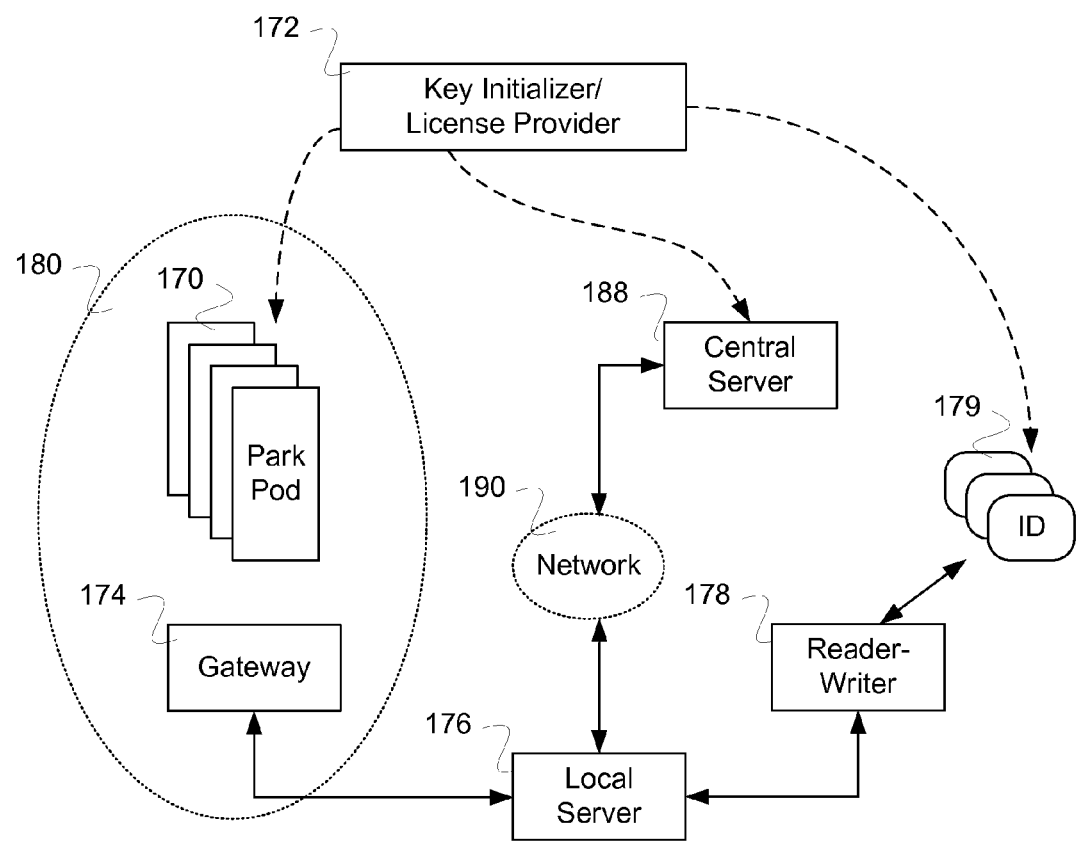

FIGS. 1a, 1b, and 1c are a block diagrams illustrating embodiments of a system for managing car electric energy exchange devices. In the examples shown, each ParkPod™ (PP) is delivered with a unique PP-key to identify the PP for any communication and administration functionality. This PP-key includes associated information—for example, country, state, area, parking lot owner, PP serial number, position data of the installation site, etc. This information is provided to the system provider central server. The central server communicates over a network (e.g., the internet) to local parking lot servers and/or gateways to assist in the management of the electric energy exchange system. In various embodiments, the managing of the system includes indicating charging privileges, indicating billing (e.g., to a user, to a parking lot owner, to a brand owner, to an alliance group, to an electric utility, etc.), alliance associations, promotions, or any other appropriate management activity.

In the example shown in FIG. 1a, an early typical installation is shown. A local ParkPod example where the local parking lot owner manages the system. At installation, production, or periodic maintenance times, key initializer/license provider 102 provides a group license for N user keys and N cards (e.g., cards with identification numbers (ID's)— for example, ID's 109). In various embodiments, the cards are pre-coded with ID's, are blank so that local server 106 with reader-writer 108 can initialize them, or any other appropriate configuration of the cards. Key initialize/license provider 102 provides information to local server 106 (e.g., a parking lot owner's (PLO's) server). Information includes authorized keys, group numbers associated with the keys, sub group numbers, user numbers, alliance group numbers, ParkPod 100 associated keys and/or numbers, etc. During operation, a user with ID 109 (e.g., a card or a registered vehicle with associated ID) requests to charge at an electric energy exchange station in a parking lot (e.g., one of ParkPod 100 electric energy exchange stations). The electric energy exchange station communicates via a local network 110 (e.g., a wireless or wired network) to gateway 104 which communicates with local server 106. Local server 106 controls pricing and access locally and can modify as desired. For example, new promotions/programs are programmed allowing an ID/card for a user additional or fewer privileges (e.g., use in the local lot at a most preferred customer rate and access to an alliance partner lot for a guest rate, etc.) or providing an electric energy exchange station with different criteria/pricing for electric energy exchange (e.g., changing from charging a user a fee for the first 45 minutes to a free half hour of charging followed by a fee of $1/hour).

In the example shown in FIG. 1b, a minimal installation where ParkPods are managed by the provider is shown. The central provider system and key coding is provided by the provider with no local server. At installation, production, or periodic maintenance times, key initializer/license provider 132 provides a group license for N user keys and N cards (e.g., cards with identification numbers (ID's)—for example, ID's 139). The cards are pre-coded with ID's. Key initialize/license provider 102 provides information to central server 148. Information includes authorized keys, group numbers associated with the keys, sub group numbers, user numbers, alliance group numbers, ParkPod 130 associated keys and/or numbers, etc. During operation, a user with ID 139 (e.g., a card or a registered vehicle with associated ID) requests to charge at an electric energy exchange station in a parking lot (e.g., one of parkpod 130 electric energy exchange stations). The electric energy exchange station communicates via a local network 140 (e.g., a wireless or wired network) to gateway 134 which communicates via a network (e.g., the internet) with central server 148. Central server 148 controls pricing and access locally and can modify as desired. For example, new promotions/programs are programmed allowing an ID/card for a user additional or fewer privileges (e.g., longer/shorter charging times, larger/smaller energy amounts, etc.) or providing a electric energy exchange station with different criteria/pricing for electric energy exchange (e.g., now a user needs to spend $50 at the store to receive "free" charging whereas before it may have been just $25, user receives a bonus of $20 for allowing utility to discharge during a peak usage time, etc.).

In the example shown in FIG. 1c, a group coordinated installation is shown, where local parking lot servers are used to manage ParkPods. In addition, one or more local parking lot servers communicate or are coordinated using a central provider server. In various embodiments, a parking lot owner (e.g., with many parking lots) manages the system, the central server/service provider manages the system, the parking lot owner and central service provider jointly manage or share management of the system, or any other appropriate configuration of management for the system. At installation, production, or periodic maintenance times, key initializer/license provider 172 provides a group license for N user keys and N cards (e.g., cards with identification numbers (ID's)—for example, ID's 179). In various embodiments, the cards are pre-coded with ID's, are blank so that local server 176 with reader-writer 178 can initialize them, or any other appropriate configuration of the cards. Key initialize/license provider 172 provides information to central server 188, and in turn to local server 176 via network 190. Information includes authorized keys, group numbers associated with the keys, sub group numbers, user numbers, alliance group numbers, ParkPod 170 associated keys and/or numbers, etc. During operation, a user with ID 179 (e.g., a card or a registered vehicle with associated ID) requests to charge at an electric energy exchange station in a parking lot (e.g., one of parkpod 170 electric energy exchange stations). The electric energy exchange station communicates via a local network 180 (e.g., a wireless or wired network) to gateway 174 which communicates via a network (e.g., the internet) with central server 148. Central server 188 controls pricing and access locally and can modify as desired. For example, new promotions/programs are programmed allowing an ID/card for a user additional or fewer privileges (e.g., longer/shorter charging times, larger/smaller energy amounts, etc.) or providing a electric energy exchange station with different criteria/pricing for electric energy exchange (e.g., now a user needs to spend $50 at the store to receive "free" charging whereas before it may have been just $25, a user receives $20 for allowing a PLO to discharge energy during a peak usage time, etc.).

System Embodiment Description: Key and License Management

General Purpose of Keys

In some embodiments, keys (identifiers) are a central element for operating the PP System. They control PP access and many other aspects of the end user experience and allow the most focused use of the PP system to further PLOs' business objectives.

Types of Keys

The system works with three principal keys:
ParkPod ID—(unique identification of each ParkPod)
User Key—(unique identification of an end user and their group (issuing PLO))
Vehicle ID—(unique identification of a vehicle)

ParkPod IDs are centrally issued and administered by the PP provider and are coded into each PP unit during the production process. PLOs' system administrators cannot modify this identifier in any way. The User Key is also issued by the PP provider and comprises a Group Number (GN), PLO-specific, a Sub-Group Number (SGN), and a unique End User Number (EUN). The User Keys are delivered either on a smart card to the PLO (e.g. in batches of 500), or as a list of enabled numbers in a data file for future card-less configurations. The use of a set of user keys is licensed to the PLO for a charge. In future applications, the User Key can be replaced or complemented by the Vehicle ID. The Vehicle ID will be integrated in the system application once the communication between vehicle and PP is enabled (at the time of this writing, required standards are still being worked out by vehicle manufacturers).

Shared Key Management

The overall issuance and management of keys is performed in part by the PP provider and in part by the PLO (PP operator). This organization of responsibilities is designed to optimize the end user experience, marketing flexibility, user privacy, system security, system reliability, ease of integration of the PP system with existing IT systems and economics. The specific functions performed by each participant are described below.

While the Group Number (GN), Sub Group Number (SGN), and the End User Number (EUN) are all issued by the PP provider, only the GN is, via the license, associated with a PLO identity (e.g. "Supermarket XYZ"). Sub Groups' (e.g. "Gold Customer") and End users' identities (e.g. "John Doe") are not associated with SGN's and EUN's by the PP provider and any such association of sub groups' or end users' identities with SGN's or EUN's is optional to the PLO, and does not have to be disclosed to the PP provider. Sub groups and End users can thus remain anonymous to the PP provider, depending on the PLO's preferences.

The PLO however can uniquely assign SGN's to end user groups or EUN's to individual end user identities and will in many cases want to do so because through this association usage can be tracked by end user and various marketing and end user discrimination tactics can (e.g. to value loyal customers) be implemented effectively.

For this and other purposes, the PLO can write additional, customer-specific data (disclosure to PP provider optional) on the smart cards, which provide spare capacity for this purpose. The hard/software for smart card coding is mostly standard (e.g., PC compatible), but will be delivered to the PLO by the PP provider as part of the license agreement.

Alliance Enablement Licenses

Should two or more PLO's decide to allow cross-access for their user groups, e.g. as part of a marketing alliance, they inform the PP provider who will then issue Alliance Enablement Licenses (AEL) to the participating PLO's. These licenses (software patches) can then be used by a PLO to allow access of partner user groups to that PLO's PP installations. Each PP device features dynamic lookup table (LUT) where all GN's for currently authorized user groups are listed. Alliance Enablement Licenses do not allow a PLO to issue user keys for another PLO's group number, so that each PLO can always keep full control over keys issued under its GN(s).

System Security

In general, all smart cards with any keys generated by the PP provider or a PLO feature encryption algorithms, which together with security software in the PP devices and/or connected servers will prevent unauthorized copying or other potential abuse or fraud.

Minimum Data Stored on Each End User's Smart Card

Each User Smart Card (USC) contains at least the following data:
  User Key (more detail below)
  List of the last X PP's used (e.g., where X is 5)
  Electric energy exchange time account balance (h), (debited after each use) or energy account balance (kWh)
  Wait time until the next allowed charge within the same group (local cluster of PP's in one parking lot area)
  Use tracking category: time-based or energy-based
  Authorized charging level (e.g., 1, 2, 3)
In some embodiments, a different minimum data stored and/or different data is stored on a user smart card.

The User Key on the USC consists of at least the following parts:
  Group # (one PLO has at least one group number but could have more)
  Sub-group # (to manage different levels of user privileges)
  End User Number # (smart card end-user, later to be replaced or complemented by vehicle ID#)
  System provider #
  Security check sum
In some embodiments, a different minimum data stored and/or different data is stored as part of a user key.

Minimum Data Stored in Each PP Device

Each PP, during one of its last production steps, is assigned a globally unique ID (PP ID) which at a minimum contains the following information:
  Country of installation
  State
  City/ZIP code
  PLO #
  PP Serial #
  GPS coordinates of installation location
  Security check sum
Furthermore, each PP device contains a lookup table (LUT), which stores a list of Groups and Sub Groups authorized to charge at this PP location. This means during user authentication, at first only a simple match between the user-provided Group and Subgroup numbers (from smartcard and/or vehicle) with at least one matching value listed in the LUT is sought. If a match can be confirmed, electric energy exchange can commence. Further levels of verification are possible through a central process (IP network enabled) which is performed in the background (see also PLO protection below). In some embodiments, a different minimum data stored and/or different data is stored in an identifier and/or on or in a PP device. In some embodiments, verification is only possible through a central process.

PLO Protection—User Blacklist

To enable a generally quick user authentication process, only the user-provided GN (1st part of User Key) is checked by the PP device via its lookup table. As soon as a match is confirmed, electric energy exchange can commence. To allow access denial for individual User Keys a further verification can be performed in the background while electric energy exchange is already in progress. For this, communication with a User Blacklist database is required. If a User Key is listed on a local or central blacklist, electric energy exchange may be stopped. This procedure may, depending on network speeds, takes up to several minutes.

Description: Wireless Communication Among PP's

Wireless communication capability among PP's enables local networking of PP's as well as wide-area networking of PP clusters with central servers, including those owned/controlled by PLO's and PP providers, or third parties (e.g. utilities, energy resellers). The local PP network is a wireless, meshed, self-organized network, i.e. continuous connectivity between any PP and a local gateway (router/hub) is not required as de-facto connectivity is always ensured through self-routing, intermediate steps from any PP to any other PP within the local network.

Data transmitted from Gateway to PP's:
  Group extensions (adding of newly authorized group #s to LUT's)
  Responses to authorization queries using complete User Keys (negative: continue electric energy exchange, positive: interrupt electric energy exchange)
  Data to be written/updated onto end user smart cards (e.g. change of electric energy exchange intervals and/or privileges, time until next charge). This data can be updated and/or exchanged with server-based PP management applications in the background Data updates for PP's LUT's and PP firmware, etc.

Data transmitted from PP to gateway:

PP occupied by User Key XYZ

PP status (ready, in use, errors etc.)

Application/Recharging Smart Cards

User smart cards can in principle be issued as pre-paid cards, or e.g. be combined with parking lot/parking garage, parking access or parking meter payment cards. PLO's can own the required hardware/software to issue and reload credit.

Pre-Paid

One option for PLO's to sell pre-paid smart cards to end users, with a fixed credit, to be debited during subsequent use. Those cards would either be generic, without user number and be disposed of after the credit has been exhausted. In a related application the cards could carry a User Key and could be re-loaded either by the PLO or by end users though a web-based application.

Integration with Other Parking Payment Systems

Combinations with existing parking payment systems are possible, e.g. those managing payment for parking garages or metered street parking End-users would thus use the same authentication/payment mechanisms they already know, e.g. a re-usable parking garage card or a metered city-managed smart card without having to carry additional cards.

Figure 2:
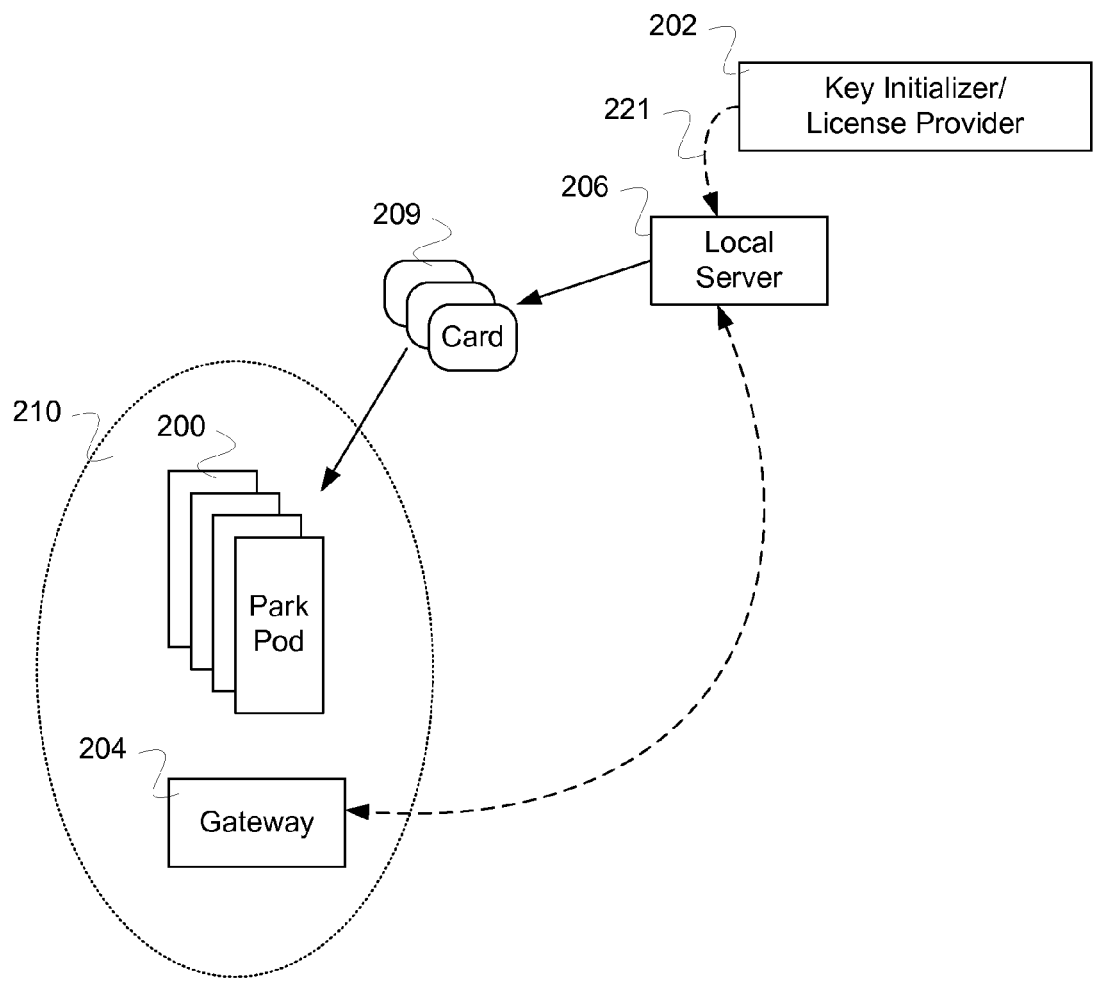
FIG. 2 is a block diagram illustrating an embodiment of a local parking lot portion of a system for managing car electric energy exchange devices.

FIG. 2 is a block diagram illustrating an embodiment of a local parking lot portion of a system for managing car electric energy exchange devices. In the example shown, a user receives a smartcard (e.g., card 209) that provides identification at a ParkPod (e.g., ParkPod 200) in a parking lot. In some embodiments, the identification comprises a vehicle serial number. The smartcard includes a user key and further information. For example, the further information includes list of ParkPod units or groups associated with user key that can be used for electric energy exchange; a balance value of electric energy exchange time or energy permitted; buffer for most recent charges (e.g., including serial number of ParkPod, time, date, amount); waiting time or non-active time at a parking lot or associated with a ParkPod; type of electric energy exchange (e.g., time or energy based charging or discharging); charging level (e.g., Level 1, Level 2, or Level 3); electric energy exchange time period; amount of energy delivered, etc. A parking lot owner is able to generate smartcards that are associated with his ParkPods and/or his group or alliance with the use of a group license or group key provided by the electric energy exchange system provider. Key initialize/License provider 202 provides a group license for user cards (e.g., smartcards). In some embodiments, the user smartcards are produced locally with the group license using a local reader-writer (e.g., attached to a local server). Note that Parkpods 200 communicate with gateway 204 via a wireless or wired network 210 including information regarding user keys used at electric energy exchange stations, electric energy exchange time used, times and dates of the electric energy exchange, etc.

Figure 3:
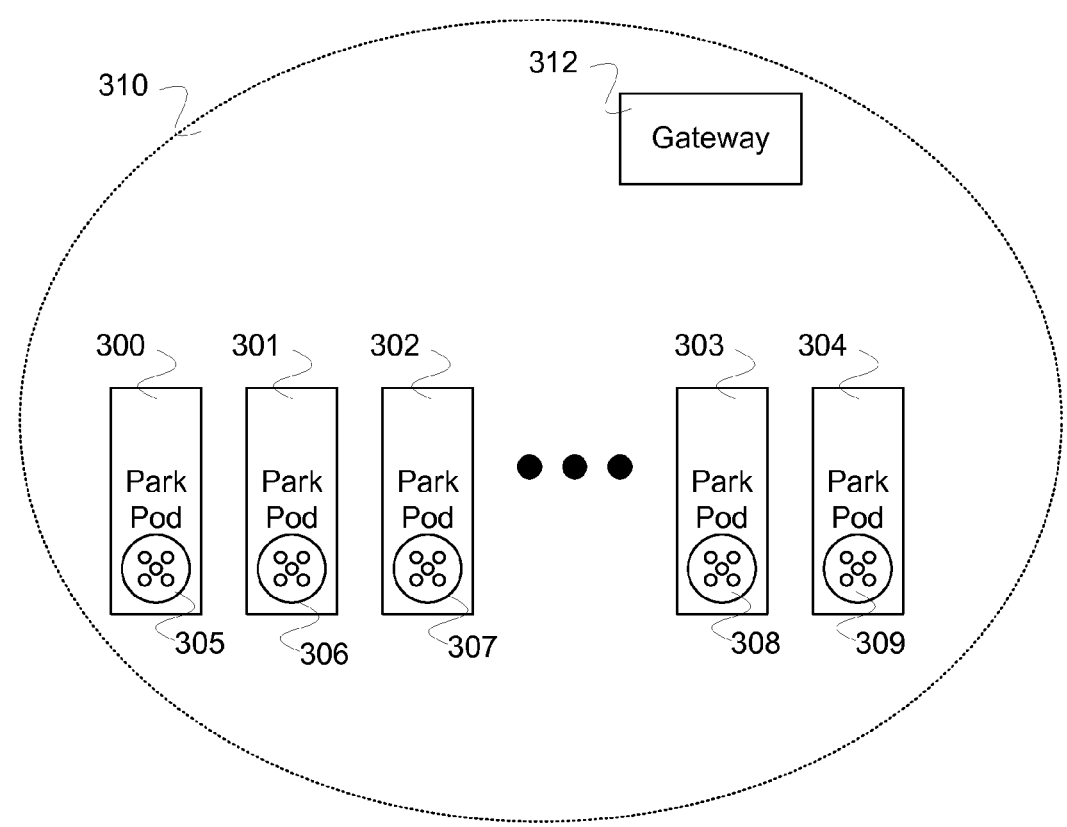
FIG. 3 is a block diagram illustrating an embodiment of ParkPods and a gateway of a system for managing car electric energy exchange devices.

FIG. 3 is a block diagram illustrating an embodiment of ParkPods and a gateway of a system for managing car electric energy exchange devices. In the example shown, local wireless network 310 is used to communicate information between local gateway 312 and a plurality of ParkPods (e.g., ParkPod 300, ParkPod 301, ParkPod 302, ParkPod 303, ParkPod 304). For example, a ParkPod sends or receives information to or from gateway 312 regarding: a user using a ParkPod; status information (e.g., free, occupied, errors, damage, etc.); ParkPod version and/or other administrative information; software updates and/or parameter updates, etc. ParkPod 300 includes plug 305. ParkPod 301 includes plug 306. ParkPod 302 includes plug 307. ParkPod 303 includes plug 308. ParkPod 304 includes plug 309.

Figure 4:
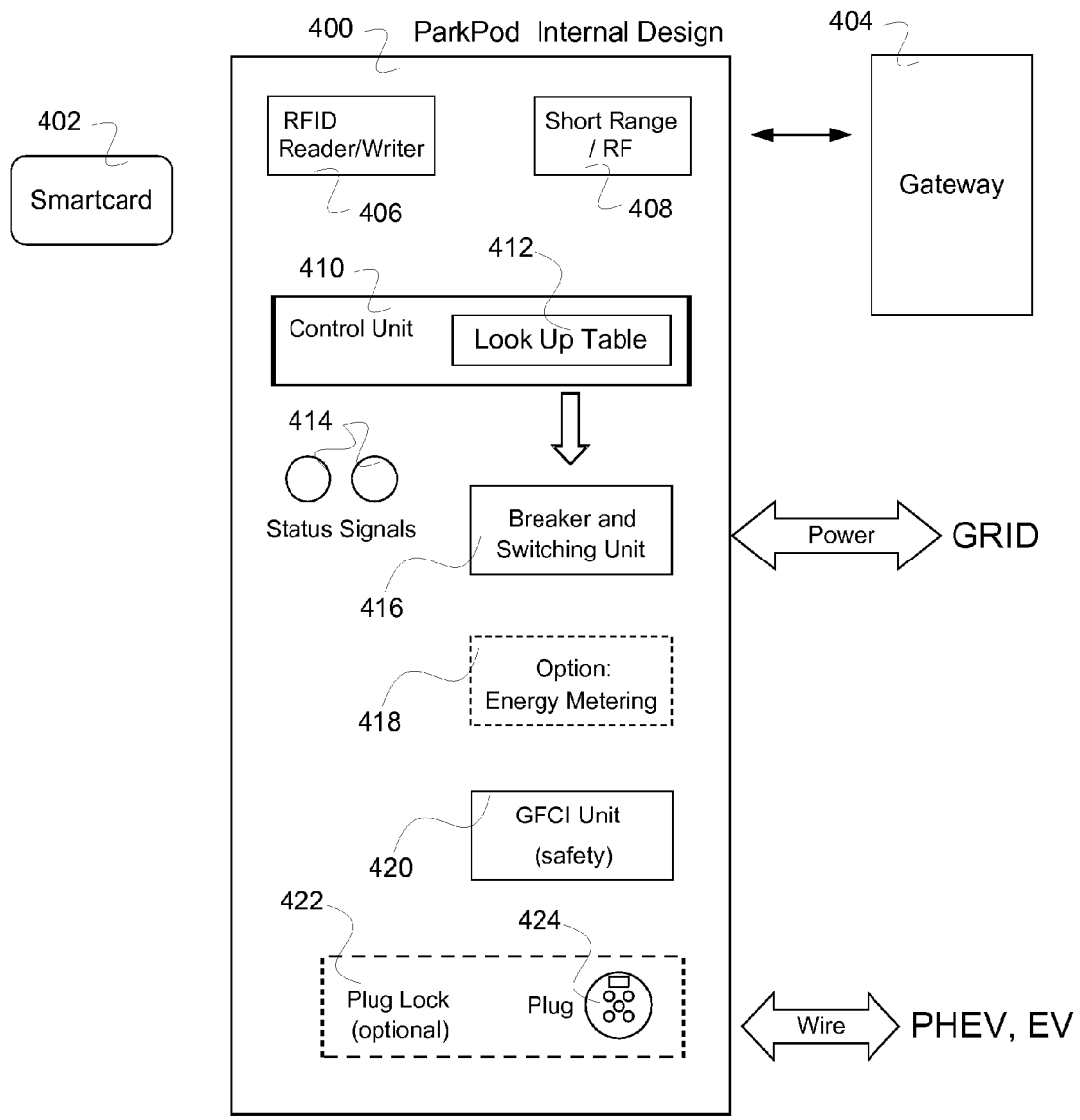
FIG. 4 is a block diagram illustrating an embodiment of a ParkPod, a core element, of a system for managing car electric energy exchange devices.

FIG. 4 is a block diagram illustrating an embodiment of a ParkPod, a core element, of a system for managing car electric energy exchange devices. In the example shown, an electric energy exchange system that includes a ParkPod (e.g., ParkPod 400) includes features and functionality as follows:

a connector (e.g., plug 424 and optional plug lock 422) providing connection to an electric vehicle (EV) to charge the EV's batteries (in a further development stage also to discharge)

capability to identify the EV and/or the user

ID checking and granting or disallowing of access privilege

Enabling of energy flow only after proper connection verified

Cross-communication among electric energy exchange stations

Optional connection of networks through gateways

Compliance with country specific safety and environmental requirements

Simple installation/maintenance of electric energy exchange units

A version of the electric energy exchange station (e.g., ParkPod) that does not provide tracking of actual energy flow (not a meter), just a time interval-controlled switching capability of the electric energy exchange process. This allows merely for programming a certain time interval during which energy flow is enabled. After expiration of this interval energy flow is automatically disconnected Electric Energy Exchange System Architecture The system comprises the following components:

Central key origination

Electric energy exchange station(s)

Configuration tools (e.g., software tools for service, initialization and customization)

Gateway or application peripheral interface to connect with customer IT systems

Central Key Information

The information stored on the key includes:

Country (e.g., where electric energy exchange station is installed)

Local system operator (e.g., a logical aggregation of parking lots/spots)

Network operator (e.g., where several local networks are cross-enabled)

Electric energy exchange station ID (e.g., a 9 digit code)

Electric Energy Exchange Device

The electric energy exchange device features include:

Access is possible after the key has been read and its ID has been validated (this requires the device intelligence to recognize all key identifier groups)

Connection to a battery (EV) is recognized as proper before voltage supply is switched on Adherence to country-specific safety and environmental functions In the event that a mechanical lock is part of the configuration, unlocking uses an identification code to allow access or unlocking A charger comprises the following parts and components:

Casing (e.g., vandalism proof) possibly with electromechanically operated, lockable lid (e.g., with or without access)

Micro controller unit (w/ communication capability from device to device and radiofrequency identification (e.g., RFID) and/or near field communication (NFC) or similar communication technology) reader 406 for user authentication)

Power supply for Microcontroller and for RFID reader 406

Display unit with status signals 414 (e.g., at least two differently colored LED's with visibility at least 60 ft)

Receptacle for electric energy exchange plug according to SAE J1772 and/or other relevant standards Power switch Fault current protection (e.g., GFCI unit 420) with automated/remote controlled GFCI restarting option Main terminal blocks (depending on max current), enabling looping through of wiring at installation Additional software functionality possibilities:
  Parking meter function
  Data recording for maintenance purposes (switch and charge cycle monitoring)
  Status reporting (occupied/vacant) to gateway Cross-device wireless communication
  Self-organizing network, each node should be accessible via various options
  Range: 50 m (150 ft) min. (unobstructed)
  Minimum of 200 parking spots coverable without additional communication bridges
  Wireless software upload (e.g. new firmware, new key tables)

RFID Read/Write unit
  a read/write unit

Display Indicators

The following indicators should be provided:
  Device ready/electric energy exchange possible
  Device not ready (error)/electric energy exchange not possible
  Electric energy exchange in progress (vehicle connected)
  Electric energy exchange finished (vehicle connected)

Device Hardware

Casing (e.g., pipe, box, etc.)

Bill of Materials for device
  Microcontroller including FLASH and RAM (e.g., control unit 410 including a look up table)
  Controller circuit board including power relay controls
  RFID read/write unit 406
  Close range wireless system
  Power supply
  Fault current protection (e.g., GFCI unit 420)
  Main terminal block (input)
  Terminal block to outlet
  Receptacle (e.g., SAE J1772 and/or other relevant standard)
  Power switch (relay)
  Fuse (wire protection)
  Display LED's
  Wiring harness
  EMV components Device Control Software Functions include:
  Scanning of RFID reader (e.g., triggering further processes after RFID verification)
  ID validity testing (e.g., allow electric energy exchange, block access, open lid)
  Firmware updating process
  Calendar function/possibly synching though gateways
  Provision of time interval
  Switching of power outlets (power switch)
  Recognition and signaling of errors
  Self-test
  Administration of access data tables (e.g., authorized IDs, user-specific intervals)
  Administration of networked devices (e.g., including indication of status) for all parking spots Set-up/customization electric energy exchange station Local user customization through parameter-setting software tool:

Two possible communication paths: First through permanently installed gateway, second a laptop-connected adapter which would have to be brought close enough to the devices to allow short-range data exchange (maintenance personnel has to drive to parking lot).

Several parameters can be customized by the system operator: e.g. length of time interval (even specific to various different end-user types)

Gateway

A gateway (e.g., gateway 404) with the same short-range wireless capabilities could connect a local device network to PLO's IT systems, and/or WANs/Internet. This allows for remote customization, management and real-time status communication. Wan connection is provided, of course for future application such as location of free parking/electric energy exchange spots or for integration in network management systems.

Possible status indications:
  Number of occupied electric energy exchange devices
  Defect devices Possible communication parameters:
  End-user ID (e.g., as on smartcard 402) at parking spot/time/date
  Interval changes (e.g. for promotions)
  Customer group-specific intervals Version 1.0
  Casing (column) with authentication (RFID) and ⅔ phase (outlet in column)
  ParkPod-issued coding with key codes specific to group of electric energy exchange stations
  Status display
  Power for Level 2 charging
  Connectivity L1/L2 parallel exact timing dependent of standards finalization
  PLO-defined energy-pricing
  PLO-defined amount tracking
  PLO-defined user access privilege management Version 2.0
  More casing options (strap-on, in-door)
  Variable, PLO-operated coding (customizable)
  Local device-to-device wireless communication
  Gateway-enabled remote management (incl. third-party network link option for PLO's, utilities etc.)
  PLO-defined user bandwidth prioritization (technical execution, e.g. tact intervals, depending on battery specs from auto OEMs Version 3.0
  Key-less user identification/authentication Version 4.0
  Bi-directional energy transfer
  Metering 418 (in not demanded earlier)

In various embodiments, a parking pod has several feature functionality sets: a version 1, a version 2, a version 3, and a version 4. For example, version 1 of a parking pod includes a column casing with radio frequency identification (RFID), a ⅔ phase outlet, a status display, and a system coupled to the parking pod allowing a parking lot owner control of energy pricing, energy amount or electric energy exchange time tracking, and user access privileges. As another example, version 2 of a parking pod includes strap on and in door casing options, inter parking pod communication, a gateway in communication with the parking pod allowing a parking lot owner control over managing the parking pods including third-party network link option for parking lot owners and energy providers/utilities and control over bandwidth prioritization for electric energy exchange.

Use Scenario Embodiment: Charge while You Shop

The year is 2010. Jane Doe lives in San Francisco and is a proud owner of one of the first GM Volts sold in The City. This morning, her Volt glides along quietly, its ReGen braking system occasionally wheezing like a Jetson's flying dish, as Jane negotiates San Francisco's steep hills downward.

Jane's green conscience is fully intact today. Her vehicle, an extended range electric vehicle (EREV) is equipped with a battery good for 50 miles of purely electric driving, and the dash indicators says: "60% capacity left". Her first destination is the school where she drops off her kids. Then she stops at the local coffee shop for a well-deserved caffeine fix. Her to-do list next stipulates a trip to Berkeley, where she is to have lunch with an old friend. "But wait, that's about 25-30 miles return distance", she ponders. This means she'd be challenged to do it all on her battery's charge, with purely electric energy at zero emissions and a cost lower than with gasoline—her "green goals". "What if I did my grocery shopping first, then I can recharge", she reasons. Shortly thereafter, she pulls up onto one of the newly equipped "Our Supermarket-Goes-the-Green-Extra-Mile-for-You" parking lots and finds a preferred spot next to the supermarket's entrance.

Marked with a green Supermarket logo, her spot is equipped with a ParkPod, an system that is easy-to-use that includes a context adaptable distribution device for electric energy, a new product category now deployed by parking lot owners around the Bay Area. She quickly connects the EREV with the ParkPod by way of her charging cable that came with her Volt. She then swipes her Supermarket Green Miles key, a small plastic strip about half the size of a credit card by the ParkPod. The device recognizes her and will now recharge her Volt's battery for the next 45 minutes. Jane knows this will give her an extra 20 or so miles, enough to safely get her across the Bay (and back if need be), all without having to use any gas.

As a Supermarket Preferred Club Customer, those 45 minutes are free for Jane, but the retailer easily recovers its expense of $0.79, by keeping her in the store just long enough to entice her to buy several extra items she hadn't planned on initially. The retailer's marketing experts not only know the profit-optimal in-store time, but have pre-set Supermarket's customized ParkPod with charging times that prevent parking spot abuse from "lot hogs".

Use Scenario Embodiment: Marketing Alliances Made Easy

Jane is now on her way to Berkeley, where she parks on the shared mini-mall lot in front of the Diner and across from the Coffee Shop in the hip Fourth Street district. The Diner, the Coffee Shop, and the Supermarket have entered a California-wide marketing alliance for electric vehicle electric energy exchange, the CAR-Green alliance (CAlifornia Retailers go Green), which is what it also says on Jane's plastic key. Little preoccupied with the inner workings of such alliances, Jane just knows to look for the CAR-Green sign to get a free charge.

The participating retailers and restaurants have formed this alliance to obtain cross marketing benefits and its technological implementation was a breeze, as the ParkPod key system was developed with much flexibility in mind. Existing keys sitting at the retailers' check-out counters like all other loyalty and pre-paid cards, or those already in use by consumers can easily be reprogrammed to enable or disable an alliance participant, right on the spot by check-out personnel. The system's master codes are administered by the electric energy exchange system provider to guarantee on-going compatibility, and its logic allows an infinite number of alliances, subgroup prioritization etc., keeping marketing flexibility high and administrative overhead at a minimum. In the second or third generation of ParkPod's, the keys will be gone and ParkPod's will recognize each user by means of wireless communication mechanisms embedded in next-gen wireless devices (e.g. smart phones) and/or the vehicle by its unique number, simplifying the user experience further.

Jane in the meantime, is on her way back to The City, reveling in her guilt-free driving experience, occasionally muttering: "This is so simple, what took us so long?"

Figure 5:
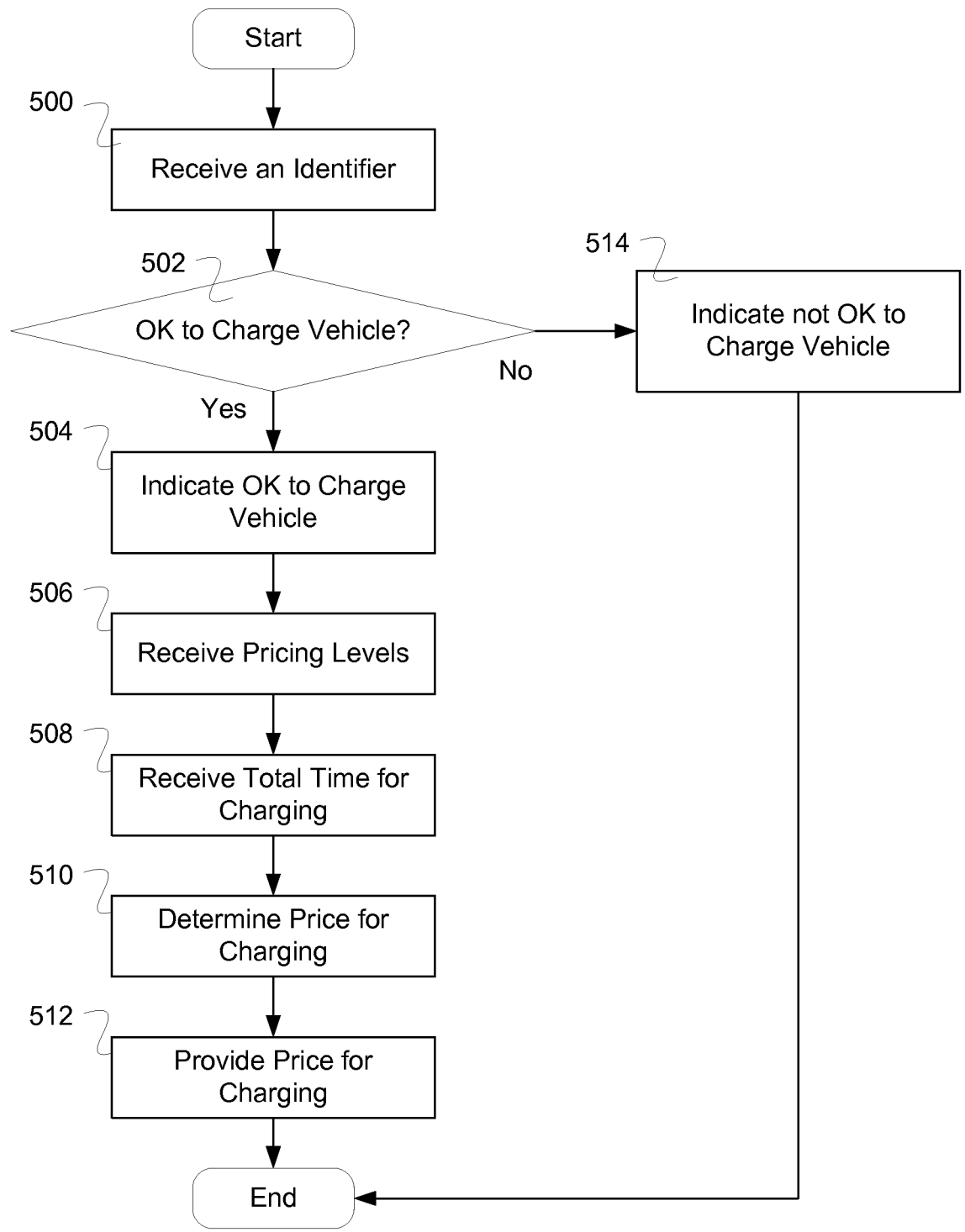
FIG. 5 is a flow diagram illustrating an embodiment of a process for managing a electric energy exchange device.

FIG. 5 is a flow diagram illustrating an embodiment of a process for managing a electric energy exchange device. In the example shown, in 500 an identifier is received. In 502, it is determined whether it is ok to charge vehicle. In the event that it is not ok to charge a vehicle, in 514 it is indicated that it is not OK to charge a vehicle. In the event that it is OK to charge a vehicle, in 504 it is indicated that it is OK to charge a vehicle. In 506, pricing levels and/or other Terms and Conditions (T&C's) are received. In various embodiments, the pricing levels and/or T&C's are received from a parking lot owner, from an energy provider, from a third party managing technical or business operations/programs on behalf of a PLO, or any other appropriate manner of receiving. In various embodiments, the pricing is positive (customer pays), zero, or negative (customer is paid). In some embodiments, the pricing levels are each associated with a loyalty level (e.g., a hierarchy of levels for example a platinum level, a gold level, a silver level, a bronze level, a preferred level, a standard level, a club member level, and a non-club member level). In some embodiments, the pricing levels are associated with a status level (e.g., a status level—for example status level comprises one or more of the following: employee status, non-employee status, alliance member, and guest member). In some embodiments, the pricing levels are different for different time windows (e.g., a first set of pricing levels is associated with a first time period and a second set of pricing levels is associated with a second time period). In some embodiments pricing levels and/or T&C's are associated with PLO's business and/or marketing objectives like: customer loyalty, customer experience, loss-leader tactics, visit duration, visit frequency, facility utilization, revenue/profit per visit, revenue/profit per customer. In some embodiments, pricing levels and or T&C's are associated with business-external considerations/conditions under which the PLO operates—for example, legal, regulatory, market prices, time of day, weather. In some embodiments, pricing levels and/or T&C's are associated with transaction-specific considerations/conditions like: customer preferences, battery/vehicle type connected, number of locally connected vehicles, locally available energy. In some embodiments, T&Cs include min/max/average values for time, direction, voltage, amperage and other parameters determining energy flow between the station and the vehicle and/or batteries of the vehicle.

In 508, total time for electric energy exchange is received. In 510, price for electric energy exchange is determined. In some embodiments, the selection of a pricing level is based on an identifier. In various embodiments, the identifier comprises one or more of the following: a key associated with a card, a vehicle identifier, or any other appropriate identifier. In 512, the price for electric energy exchange is provided. In various embodiments, the price is provided to one or more of the following: a point of sale device, a credit card electric energy exchange system, a network payment transfer system, or any other appropriate end point for the price information.

In some embodiments, a mall management company (PLO) offering customer parking has an incentive to attract customers to their mall, and thus increase the value of being represented at this mall for the mall's tenants (e.g. retailers). The mall operator installs EV electric energy exchange stations to allow customers to recharge their vehicle's batteries while shopping. The computerized-clothing retailer "Apple Republic" (AR) decides to attract customers to their store by offering them free charging if they have achieved "gold level", meaning they spend more than $200/month at AR. The restaurant chain "Olé Olé" (OO) in the same mall decides to give all of their customers a 1 hour charge for $1.00 if they eat a meal for $10.00 or more. Both AR and OO are partners in the program of the electric utility "Clean California" (CC), which allows voluntarily participating EV drivers, from 2-4 PM on hot summer days to sell energy from their batteries, through electric energy exchange station of participating PLO's back to the utility during peak load hours, allowing the utility to put more wind and solar power on the grid and retire some of its fossil fuel-burning power plants. July 4, 2:30 PM, a sunny 95° F., Jane Doe arrives at the mall in her EV, to shop for more clothes at AR, where she is a gold level customer. She is aware of the free charging by AR and the energy buy-back by CC. She connects her vehicle to the electric energy exchange station. Her smart phone in her handbag wirelessly connects with the electric energy exchange station's authentication system. The system checks for the vehicle ID and matches it with the smart phone ID, uniquely authenticating Jane to charge/discharge. Since Jane's battery is still 90% full and she has indicated a minimum level of 60% for holidays on her CC web profile, the utility's computer sends her a text message asking if she agrees to discharge her battery to 60% and receive $3 in return, credited to her AR account. To protect the battery, the discharge will take place over the time of 1½ hours, and Jane is now granted the right to park for 2 hours by AR. Jane presses the "Yes, I agree!" button in her message, thus confirming the transaction. Then she goes shopping, at AR to receive her $3 credit. Right afterwards, she meets her uncle, John Doe for a Margarita at OO. Jane presses the "Yes, I agree!" button in her message, thus confirming the transaction. Then she goes shopping, at AR to receive her $3 credit. Right afterwards, she meets her uncle John Doe for a Margarita at 00. Jane's uncle, John Doe, meanwhile, who had reached the electric energy exchange-station equipped parking lot at 3:10 p, caused a somewhat simpler transaction. He arrived, plugged in, identified himself using his PLO-issued RFID card, charged 4 kWh over a 1 h period into his EV while snacking and having a few Margaritas with Jane at OO, which put $1.00 for subsidized electricity on his tab though a connected POS system, as the drinks he bought Jane brought his meal tab over $10.00. "Wonderful", they think, taking their last sips. "Free stuff, free drinks, enough power, all clean—cheers!" The marketers and accountants at AR and OO, together with the load balancers and accountants at CC have all been served well by PP DEEEE—and agree with the Does.

In some embodiments, the system has performed the process: 1) Identification; 2) Determination of Price and T&Cs; 3) Vehicle/Grid Energy Transfer; 4) Transaction Data Logging; and 5) Experience-Based Operations Improvement. In some embodiments, the process is then repeated for the next customer. Below provides a more detailed description of the above process:

Step 1, Identification of
customer, based on
    her customer ID on her smart phone,
    her group ID, also on her smart phone,
    her vehicle ID, through wire line communication between station and car
    her battery type, and its allowed charge and discharge speeds
electric energy exchange station, with the unique station ID and IP connection
And
Step 2, Determination of Price and T&Cs based on:
AR's business-internal considerations and AR's matching parameters (e.g. increase customer loyalty by offering free charging for gold level customers),
AR business-external parameters, namely CC's parameters (e.g. $3 offer for 6 kWh energy buy-back between 2 and 4 p), the weather (e.g. warmer than 95° F. ambient temperature), the date and time of day (e.g. July $4^{th}$, between 2 and 4 pm), Jane's input (agree to discharge), the vehicles' input (e.g. battery charge status, battery capacity).
And is now ready to perform:
Step 3, Vehicle/Grid Energy Transfer, in this example:
discharge Jane's battery over 1½ hours
and credit $3 to her store account at AR
And is then ready to perform:
Step 4, Transaction Data Logging, in this example:
all IDs as listed under 3,
price ($3 to Jane)
T&C parameters (set targets and actuals)
    2 h connection time granted (set),
    1 h 20 min actual discharge time occurred (then the vehicle controls indicated battery at 60% and automatically interrupted the discharge circuit, even though Jane had not yet unplugged the vehicle)
    2:10 h actual time connected (Jane overstayed slightly)
approximated energy transferred (battery charge state before/after, battery capacity, discharge time, temperature correction factor, all in computation)
And is then ready to perform:
Step 5, Experience-Based Operations Improvement, in this example:
    Understand Jane's customer type's (gold) receptiveness to the incentives from AR and CC (they ran ads to make customers aware). Both will continue to run the same ads next time . . . .
    Understand CC's effectiveness in buying energy from distributed storage (EV's) in peak times—they were effective to entice Jane, but the real-time market price was only $2.50, so CC overpaid $0.50, next time they will offer only $2.00 under similar conditions . . . .
And Step 6, Repeat for next customer.

Figure 6:
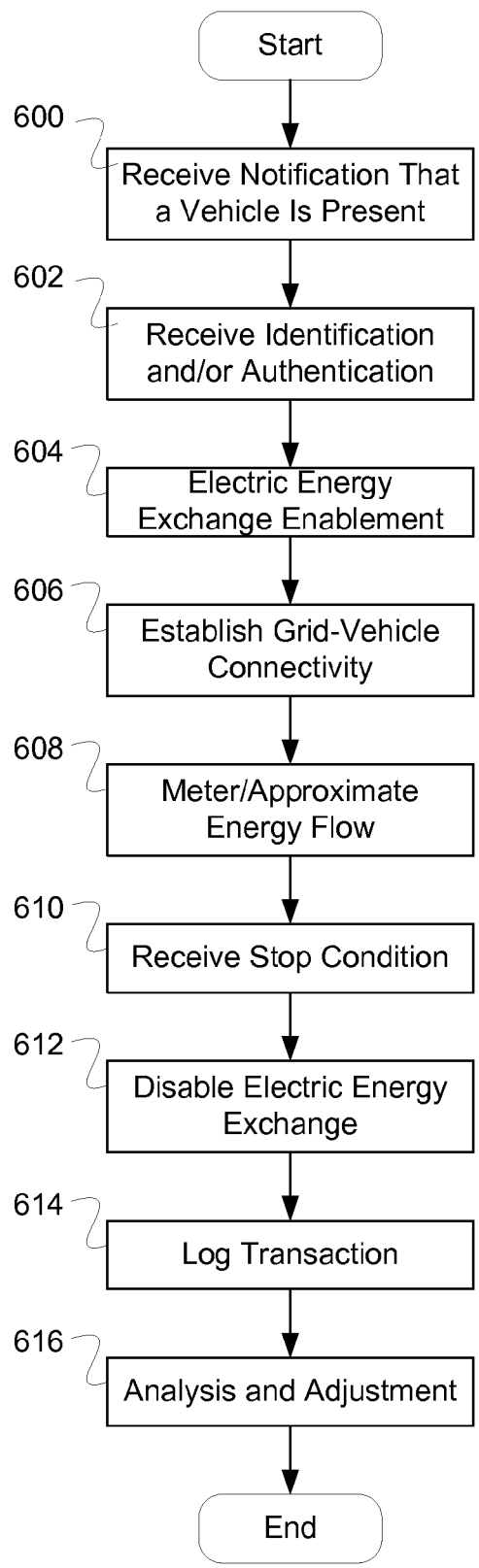
FIG. 6 is a flow diagram illustrating an embodiment of a process for managing a electric energy exchange device.

FIG. 6 is a flow diagram illustrating an embodiment of a process for managing a electric energy exchange device. In the example shown, in 600 a notification is received that a vehicle is present. In various embodiments, the electric energy exchange station is aware that the vehicle is connected because the vehicle is plugged in to the electric energy exchange station, because the vehicle is detected using a sensor (e.g., an inductive detector), a battery is detected, a communication is received, or any other appropriate manner. In 602, identification and/or authentication is/are received. For example, identification and/or authentication are provided using an ID card, a station key pad, a credit or debit card, a vehicle wire line, a cell phone, a cell phone with embedded ID technology, a cell phone network, or using any other appropriate manner. In 604, electric energy exchange is enabled. In various embodiments, enabling electric energy exchange is determined based at least in part on PLO-internal pre-determined parameters or PLO-external pre-determined parameters where the parameters are either explicit values or implicit (default) values. In some embodiments, enabling electric energy exchange is determined based at least in part on transaction-specific parameters and values. In some embodiments, electric energy exchange is enabled after implicit or explicit approval by the user. In 606, grid-vehicle connectivity is established. In 608, energy flow is metered/approximated. In various embodiments, the energy flow metering is time based metering, is energy or power based metering, or is based on any other appropriate manner. In 610, a stop condition is received. For example, a stop condition comprises one of the following: a customer logs out, a customer un-plugs, a preset electric energy exchange limit is reached, a vehicle's battery is full, etc. In 612, electric energy exchange is disabled. In some embodiments, it is indicated that it is OK to disconnect and then the vehicle is unplugged. In 614, the transaction is logged. For example, the input parameters are logged, the pricing is logged, the Terms and conditions are logged, the user inputs are logged, and the transaction values are logged (e.g., the parking space, the time, the date, the amount of energy delivered, the time spent connected, etc.). In 616, the system performance is analyzed and adjusted. In various embodiments, adjustment targets optimization of system operating parameters to improve system performance for the goals of an electric energy exchange system, a utility, a business, a parking lot owner, and/or any other appropriate entity.

Figure 7:
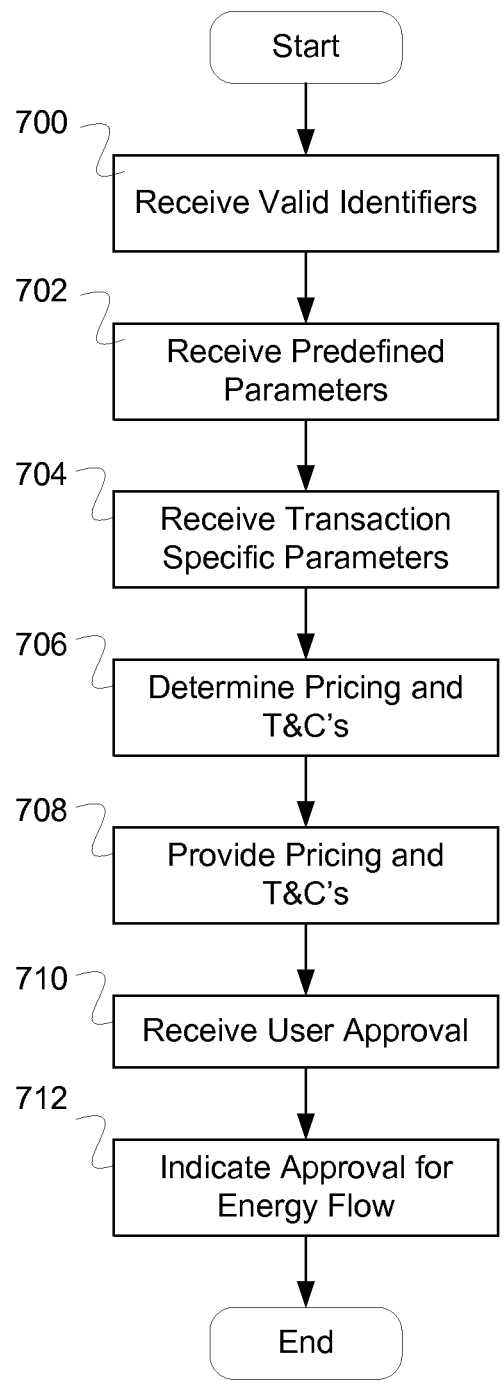
FIG. 7 is a flow diagram illustrating an embodiment of a process for managing a electric energy exchange device.

FIG. 7 is a flow diagram illustrating an embodiment of a process for managing a electric energy exchange device. In some embodiments, the process of FIG. 7 is used to implement 604 of FIG. 6. In some embodiments, the process is referred to as a ParkPod's Dynamic Energy Exchange Economics Enablement (PP DEEEE).

In various embodiments, the process of FIG. 7 is executed in a processor associated with a electric energy exchange device, by a connected local server, by a connected central server, by a remote data center or "cloud," or in any other appropriate processing device.

In the example shown in FIG. 7, in 700 a valid identifier is received. In some embodiments, the valid identifier is one of a plurality of valid. Valid means e.g. authorization for this user and/or vehicle and/or battery has been given previously to continue with the process toward allowing energy flow. In various embodiments, an identifier includes one of the following: an individual customer ID, a customer group ID, a vehicle ID, a battery ID, or any other appropriate identifier. In some embodiments, the identifier includes a value indicating that an identification, authentication, validation, or verification process has been affirmatively concluded.

In 702, predefined parameters are received. Predefined parameters include price or one or more terms and conditions. In some embodiments, a predefined parameter comprises a parameter that is received independently of any specific user or transaction (e.g., before, during or after a transaction) whether a user/vehicle/battery is plugged in and identified or not. In some embodiments, these parameters include PLO-business-internal parameters, which are fully controlled or determined by the PLO or primary operator of the system, and include one or more of the following: price levels by loyalty status (e.g., a set of loyalty levels in a hierarchy each with an associated price), specific promotions-based price levels, loss-leader price levels, maximum/minimum electric energy exchange times, maximum/minimum energy amounts exchanged, electric energy exchange priority during conditions of supply constraints, energy in exchange for ad viewing/consumption, etc. In some embodiments, a parameter comprises an energy provider-determined parameter e.g., load-balancing considerations, local or regional grid capacity management, etc. In some embodiments, these parameters include PLO-business-external parameters, which are not fully controlled by the PLO or primary operator of the system) and include one or more of the following: energy price levels based on day of week or time of day, legal or regulatory constraints, pre-defined user or business alliance partner preferences—for example, captured through previously defined user or partner profiles, etc. In various embodiments, the pricing levels and/or T&C's are received from an energy provider, from a third party managing technical or business operations/programs on behalf of a PLO, or any other appropriate provider of pricing levels. In various embodiments, the pricing is positive (customer pays), zero, or negative (customer is paid). In various embodiments, step 602 is performed before or concurrently with step 604 and/or step 600.

In 704, transaction specific parameters are received. Transaction specific parameters include price and T&C parameters. Transaction-specific parameters comprise parameters that are received during a transaction (e.g., after a transaction has been initiated, e.g., through identification/authentication/validation/verification of ID(s) and before the transaction with a certain user/vehicle/battery has been fully completed). In various embodiments, transaction-specific parameters comprise one or more of the following: a calendar date, a time of day, energy rates as charged or credited by the energy provider, wholesaler or grid operator, a parking lot or spot ID, an energy exchange device ID and type, a battery ID and type, a battery capacity, a vehicle ID and type, a charge level, a battery temperature, an environmental temperature, an environmental barometric pressure, an environmental humidity level, a local grid voltage, a local grid voltage variation, a local grid AC frequency, a local grid AC frequency variation, a local grid utilization/stress indicator, a number of locally connected energy consumers, a size of locally connected energy consumers, a local energy availability, and customer "real-time" preferences like his/her time available. In various embodiments, step 704 is performed before or concurrently with step 702 and/or step 700.

In 706, pricing and T&C's are determined. Some or all input parameters previously received are used to determine, via a model, the suggested price(s) and T&C's for an impending transaction of energy transfer. In some embodiments, the price and T&C information so determined includes one or more of the following: direction of energy flow, amount of energy transferred, energy flow rates allowed (e.g., maximum/minimum/average over a time window or windows), total connect time allowed, number of connect intervals, price charged to user or paid to user, and total park time allowed, parking location allowed.

In 708, pricing and T&C's are provided. For example, the suggested price(s) and T&C's for the impending transaction are communicated. In some embodiments, this communication is to the user or other relevant approval entity, e.g. a decision-making system etc. In various embodiments, the means of connecting with the user or other approval authority is via GUI, display on the station, web-based interface, browser-based interface, display in the vehicle, hand-held display (e.g., smart-phone, cell phone, computer, terminal), text message, e-mail, SMS, embedded near-field functionality in a user's hand held device, RF device, or any other appropriate means of connecting.

In 710, user approval is received. In various embodiments, user approval is explicit (e.g., a user's or his or her agent's affirmative response to a previously sent communication using the same or other user/system communication/interaction interfaces as described in 708), and/or it is implicit (e.g., a system feed of a previously recorded authorization by the user or his or her agent, either unconditional or once a certain set of conditions specified in such an authorization has been met—for example, once the energy price charged to the user drops below a certain threshold (Grid to Vehicle or G2V) or the price for an energy charge sold by the user to the grid (vehicle to grid or V2G) exceeds a certain amount).

In 712, approval for energy flow is indicated. In some embodiments, once all relevant previous steps have been successfully concluded, the system/sub process communicates its resulting transaction control parameters including the authorization to begin energy flow (from this processes' vantage point) to other relevant processes including one or more of the following: any power switch control processes, metering/energy approximation processes, stop-condition processes, safety monitoring processes, and main power plug locking confirmation.

In various embodiments, the process flow varies from the one described above in that the sequence of steps described is a different one, and/or certain steps are performed concurrently rather than sequentially and/or certain steps are omitted.

In some embodiments, along the process flow from 700 to 712 the system can abandon the process at any point where the required step could not be successfully completed for any reason where an. associated "exit" or "go-to-end" branches of these process flows are not explicitly depicted in FIG. 7.

Figure 8:
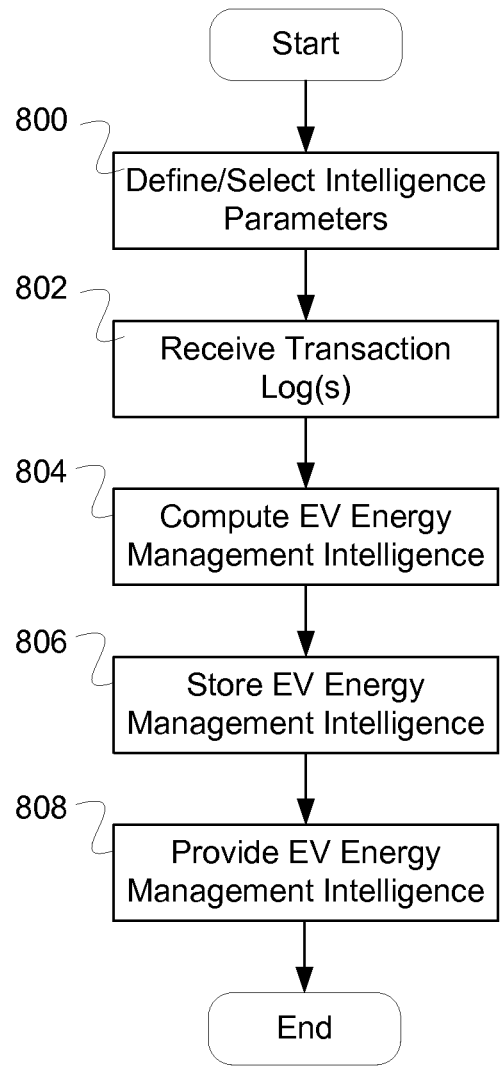
FIG. 8 is a flow diagram illustrating an embodiment of a process for managing a electric energy exchange device.

FIG. 8 is a flow diagram illustrating an embodiment of a process for managing a electric energy exchange device. In some embodiments, the process of FIG. 8 is used to implement 616 of FIG. 6. In some embodiments, the process is referred to as a ParkPod's Experience-Based Operations Improvement (PP EBOI).

In various embodiments, the process of FIG. 8 is executed in a processor associated with a electric energy exchange device, by a connected local server, by a connected central server, by a remote data center or "cloud," or in any other appropriate processing device.

In the example shown, in 800 intelligence parameters are defined/selected. In some embodiments, a set of PP EBOI energy management parameters is selected from a provided set or defined by the operator. In some embodiments, intelligence parameters are logged to track parameters for marketing effectiveness (e.g., parameters such as user price sensitivity, promotion offer acceptance, incremental revenue per visit are logged). In some embodiments, intelligence parameters are logged to track user compliance (e.g., compliance with time limits, proper connection/disconnection procedures etc.). In some embodiments, intelligence parameters are logged to track user adoption behavior (e.g., type of user utilizing electric energy exchange stations away from home, user familiarization with operations measured by time to perform a common sequence of steps, etc.). In some embodiments, intelligence parameters are logged to track asset management parameters (e.g., durability, error frequency, time-in-service, time-out-of service, etc.). In some embodiments, intelligence parameters are logged to track load balancing parameters (e.g., electricity demand and supply by time-of-day, or day-of-week, etc.). In some embodiments, intelligence parameters are logged to track electric energy exchange behavior away from home for third parties (e.g., auto manufacturers, battery manufacturers, non-profit research organizations, energy suppliers, transmission companies, etc.).

In 802, transaction logs are received. For example, the system receives transaction logs populated with the necessary data to analyze the selected parameters.

In 804, EV energy management intelligence is computed. For example, the system performs the computations necessary to analyze the data and produce the intelligence sought to allow experience-based operations improvements. In some embodiments, this could include the "actual compliance" computed of the difference between the parking time provided by the system to the user during the T&C communication phase of PP DEEEE and the time the user actually spent on the parking lot before freeing it up for the next customer, or the "price sensitivity", either for a group of users or a single user tracked over a number of visits, etc., or the "asset reliability" by tracking the up-time of a certain station, or a group of stations depending on the usage times and frequencies to pinpoint equipment malfunction or user error root causes, etc.

In 806, EV energy management intelligence is stored. For example, the system stores the operational parameter history/intelligence for later retrieval by querying processes. In various embodiments, operational parameter history/intelligence is routed to other processes (e.g., point of sale system, other software systems, etc.) before being stored or in parallel to being stored.

In 808, EV energy management intelligence is provided. For example, the system provides stored intelligence to other downstream processes. In various embodiments, these include payment processing, POS integration, or any other appropriate processes. In some embodiments, the system provides operations parameter intelligence to the PP DEEE process to converge T&C's for future transactions into more useful ranges, e.g. the time provided to connect and disconnect, based on average non-compliance and error rates etc.

In various embodiments, the process flow varies from the one described here in that the sequence of steps described is a different one, and/or certain steps are performed concurrently rather than sequentially and/or certain steps are omitted.

In some embodiments, along the process flow from 800 to 808 the system can abandon the process at any point where the required step could not be successfully completed for any reason where an. associated "exit" or "go-to-end" branches of these process flows are not explicitly depicted in FIG. 8.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electric energy exchange device for managing exchange of electric energy with a vehicle, comprising:
   a switch and switching unit coupled to a power grid, wherein the electric energy exchange device is one of a set of electric energy exchange devices, wherein the electric energy exchange device is coupled to a vehicle to exchange electric energy; and
   a processor configured to:
   receive a set of predefined parameters for exchanging electric energy for the vehicle using the electric energy exchange device for a time increment;
   determine whether a wait time has elapsed until a next allowed charge for a subset of the set of electric energy exchange devices for bandwidth management of power with the power grid in the event that the electric energy exchange comprises charging;

determine whether a level of a customer meets predefined parameters for electric energy exchange; and
in the event the level of the customer meets the predefined parameters for electric energy exchange and the wait time has elapsed until a next allowed charge in the event that the electric energy exchange comprises charging, control the switch to allow access to exchange energy with the vehicle; and
a memory coupled to the processor and configured to provide the processor with instructions.

2. An electric energy exchange device as in claim 1, wherein the set of predefined parameters is determined by a parking lot owner.

3. An electric energy exchange device as in claim 1, wherein the set of predefined parameters is determined by a third party, wherein the third party comprises an energy provider and/or an alliance partner.

4. An electric energy exchange device as in claim 1, wherein the set of predefined parameters comprises price levels associated with the level of the customer.

5. An electric energy exchange device as in claim 1, wherein levels of customers comprises a hierarchy of loyalty levels.

6. An electric energy exchange device as in claim 5, wherein the loyalty levels include one of the following: a platinum level, a gold level, a silver level, a bronze level, a preferred level, a standard level, a club member level, and a non-club member level.

7. An electric energy exchange device as in claim 1, wherein the set of predefined parameters includes one or more of the following: specific promotions-based price levels, loss-leader price levels, energy exchange times, energy rates as charged or credited by the energy provider, wholesaler or grid operator, energy exchange durations, energy amounts exchanged, charging priority during conditions of grid capacity or supply constraints, discharging priorities during conditions of grid capacity and oversupply and energy in exchange for ad viewing/consumption.

8. An electric energy exchange device as in claim 1, wherein the processor is further configured to receive a set of transaction specific parameters.

9. An electric energy exchange device as in claim 1, wherein the processor is further configured to determine terms and conditions for exchanging electric energy.

10. An electric energy exchange device as in claim 9, wherein the terms and conditions include one or more of the following: a direction of energy flow, an amount of energy transferred, an energy flow rate allowed, a total connect time allowed, a number of connect intervals, a price charged to user or paid to user, and a total park time allowed.

11. An electric energy exchange device as in claim 1, wherein the processor is further configured to receive a user approval.

12. An electric energy exchange device as in claim 1, wherein the processor is further configured to approve energy flow.

13. An electric energy exchange device as in claim 1, wherein the processor is further configured to receive an identifier.

14. An electric energy exchange device as in claim 13, wherein the identifier comprises a valid identifier.

15. An electric energy exchange device as in claim 13, wherein the identifier comprises an individual customer ID.

16. An electric energy exchange device as in claim 13, wherein the identifier comprises a customer group ID.

17. An electric energy exchange device as in claim 13, wherein the identifier comprises a vehicle ID or a battery ID.

18. An electric energy exchange device as in claim 13, wherein the identifier comprises a parking lot or spot ID.

19. An electric energy exchange device as in claim 13, wherein the identifier comprises an electric energy exchange station ID or an electric energy exchange station coupler ID.

20. An electric energy exchange device as in claim 13, wherein the processor is further configured to analyze system performance and adjust the set of predefined parameters.

21. An electric energy exchange device as in claim 8, wherein the transaction-specific parameters include one or more of the following: a calendar date, a time of day, energy rates as charged or credited by the energy provider, wholesaler or grid operator, a parking lot or spot ID, an energy exchange device ID and type, a battery ID or type, a battery capacity, a vehicle ID or type, a charge level, a battery temperature, an environmental temperature, an environmental barometric pressure, an environmental humidity level, a local grid voltage, a local grid voltage variation, a local grid AC frequency, a local grid AC frequency variation, a local grid utilization/stress indicator, a number of locally connected energy consumers, a size of locally connected energy consumers, a local energy availability, and a customer time available.

22. An electric energy exchange device as in claim 1, wherein the processor is further configured to determine a price for electric energy exchange based at least in part on the set of predefined parameters and the set of transaction specific parameters.

23. A method for managing exchange of electric energy with a vehicle by an electric energy exchange device, comprising:
receiving, using a processor, a set of predefined parameters for exchanging electric energy for a vehicle using an electric energy exchange device for a time increment, wherein the electric energy exchange device comprises a switch and switching unit coupled to a power grid, wherein the electric energy exchange device is one of a set of electric energy exchange devices, wherein the vehicle is coupled to the electric exchange device to exchange electric energy;
determining whether a wait time has elapsed until a next allowed charge for a subset of the set of electric energy exchange devices for bandwidth management of the power with the power grid in the event that the electric energy exchange comprises charging;
determining whether a level of a customer meets predefined parameters for electric energy exchange; and
in the event the level of the customer meets the predefined parameters for electric energy exchange and the wait time has elapsed until a next allowed charge in the event that the electric energy exchange comprises charging, control the switch to allow access to exchange energy with the vehicle.

24. A computer program product for managing exchange of electric energy with a vehicle by an electric energy exchange device, the computer program product being embodied in a non-transitory computer readable storage medium and comprising computer instructions for:
receiving a set of predefined parameters for exchanging electric energy for a vehicle using an electric energy exchange device for a time increment, wherein the electric energy exchange device comprises a switch and switching unit coupled to a power grid, wherein the electric energy exchange device is one of a set of electric energy exchange devices, wherein the vehicle is coupled to the electric exchange device to exchange electric energy;

determining whether a wait time has elapsed until a next allowed charge for a subset of the set of electric energy exchange devices for bandwidth management of power with the power grid in the event that the electric energy exchange comprises charging;

determining whether a level of a customer meets predefined parameters for electric energy exchange; and in the event the level of the customer meets the predefined parameters for electric energy exchange and the wait time has elapsed until a next allowed charge in the event that the electric energy exchange comprises charging, control the switch to allow access to exchange energy with the vehicle.

\* \* \* \* \*